US009745904B2

United States Patent
Kassai et al.

(10) Patent No.: US 9,745,904 B2
(45) Date of Patent: Aug. 29, 2017

(54) INTERNAL COMBUSTION ENGINE CONTROL DEVICE, AND CONTROL METHOD

(71) Applicant: NISSAN MOTOR CO., LTD., Yokohama-shi, Kanagawa (JP)

(72) Inventors: Masaharu Kassai, Yamato (JP); Takashi Araki, Chigasaki (JP); Taisuke Shiraishi, Kawasaki (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/891,719

(22) PCT Filed: Feb. 25, 2014

(86) PCT No.: PCT/JP2014/054411
§ 371 (c)(1),
(2) Date: Nov. 17, 2015

(87) PCT Pub. No.: WO2014/199667
PCT Pub. Date: Dec. 18, 2014

(65) Prior Publication Data
US 2016/0123248 A1    May 5, 2016

(30) Foreign Application Priority Data
Jun. 11, 2013    (JP) ................................. 2013-122342

(51) Int. Cl.
*F02D 35/02*    (2006.01)
*F01M 11/10*    (2006.01)
(Continued)

(52) U.S. Cl.
CPC ........... *F02D 35/027* (2013.01); *F01M 11/10* (2013.01); *F02D 31/001* (2013.01); *F02D 35/02* (2013.01);
(Continued)

(58) Field of Classification Search
CPC .......... F02D 9/02; F02D 11/10; F02D 31/001; F02D 35/02; F02D 35/023; F02D 35/027;
(Continued)

(56) References Cited

U.S. PATENT DOCUMENTS 6,371,076 B1    4/2002    Kamijo et al.
8,639,432 B2    1/2014    Matsuo et al.
(Continued)

FOREIGN PATENT DOCUMENTS

DE    10 2010 003 305 A1    9/2011
JP    2001-065401 A    3/2001
(Continued)

*Primary Examiner* — John Kwon
*Assistant Examiner* — Johnny H Hoang
(74) *Attorney, Agent, or Firm* — Drinker Biddle & Reath LLP (57) ABSTRACT

In order to prevent an abnormal combustion due to oil, a restriction region (B) is designated on a low-speed and high-load side of an internal combustion engine (1), and an opening of throttle valve (12) is restricted so that an engine operating condition is not observed within the restriction region (B). A predetermined designated inspection region (A) is set so as to include the restriction region (B), and it is judged whether or not the abnormal combustion actually occurred when the internal combustion engine (1) is running within the designated inspection region (A). If the abnormal combustion was detected, the restriction region (B) is expanded, meanwhile, if the abnormal combustion was not detected, the expanded restriction region (B) is gradually decreased. If the abnormal combustion occurred at a shorter interval than a threshold value, the restriction region (B) is expanded at once to a predetermined size.

12 Claims, 6 Drawing Sheets

(51) Int. Cl.
*F02D 41/02* (2006.01)
*F02D 41/06* (2006.01)
*F02D 41/22* (2006.01)
*F02D 41/00* (2006.01)
*F02D 31/00* (2006.01)

(52) U.S. Cl.
CPC ..... *F02D 41/0002* (2013.01); *F02D 41/0225* (2013.01); *F02D 41/068* (2013.01); *F02D 41/22* (2013.01); *F02D 35/023* (2013.01); *F02D 2041/227* (2013.01); *F02D 2041/228* (2013.01); *F02D 2200/021* (2013.01); *F02D 2250/26* (2013.01); *Y02T 10/42* (2013.01)

(58) Field of Classification Search
CPC ............ F02D 41/0002; F02D 41/0225; F02D 41/068; F02D 41/22; F02D 2041/228; F02D 2250/26; F02D 2200/021; F02D 45/00; F01M 11/06; F01M 11/10; B60W 10/04; B60W 10/06; B60W 10/11; Y02T 10/42
USPC ... 123/319, 325, 330, 435, 436, 479, 198 D; 701/107, 110–114; 73/114.04, 114.22, 73/114.36
See application file for complete search history.

(56) References Cited

U.S. PATENT DOCUMENTS

| | | | |
|---|---|---|---|
| 2003/0010324 A1* | 1/2003 | Joos | F02D 41/20 123/478 |
| 2011/0246049 A1 | 10/2011 | Matsuo et al. | |
| 2013/0333662 A1* | 12/2013 | Okada | F02D 35/02 123/319 |
| 2015/0013637 A1* | 1/2015 | Kassai | F02D 41/068 123/294 |

FOREIGN PATENT DOCUMENTS

| | | |
|---|---|---|
| JP | 2001-193534 A | 7/2001 |
| JP | 2011-163322 A | 8/2011 |
| JP | 2011-163322 A | 8/2011 |
| JP | 2011-226473 A | 11/2011 |
| JP | 2011-231741 A | 11/2011 |
| JP | 2012-092718 A | 5/2012 |
| WO | WO-2012/111145 A1 | 8/2012 |
| WO | WO 2012/111145 A1 | 8/2012 |

* cited by examiner

INTERNAL COMBUSTION ENGINE CONTROL DEVICE, AND CONTROL METHOD

TECHNICAL FIELD

The present invention relates to control device and control method for a spark-ignition internal combustion engine, devised to suppress an abnormal combustion which is caused by oil in a low-speed and high-load region of the engine.

BACKGROUND ART

In the case of spark-ignition internal combustion engine, there is a possibility that an abnormal combustion which is sometimes called "super knock" occurs. This is a phenomenon in which an ignited combustion starts earlier than a proper ignition timing due to an entry of oil components into a combustion chamber while a warming-up is in execution in a state where a temperature of cylinder wall is relatively low. This abnormal combustion occurs only in a low-speed and high-load region. Hence, Patent Literature 1 and Patent Literature 2 disclose a technique of restricting an operating region of the internal combustion engine so as to avoid an actual engine operation in the low-speed and high-load region over which the abnormal combustion generates a problem, when a quantity of oil which intrudes into the cylinder or the like becomes in a state where the abnormal combustion is likely to occur.

However, even in the case that the low-speed and high-load region is defined as a restriction region, and an actual engine operating condition (i.e., torque and rotational speed) is restricted so as not to enter the restriction region as mentioned above; the abnormal combustion can infrequently occur according to various conditions. If the restriction region is set as an excessively large area in order to certainly prevent such an infrequent abnormal combustion, there is a concern that torque shortage is caused at the time of vehicle acceleration or the like. On the other hand, if the restriction region is set as an excessively small area, the abnormal combustion occurs frequently. These both treatments are not favorable.

CITATION LIST

Patent Literature

Patent Literature 1: Japanese Patent Application Publication No. 2012-92718
Patent Literature 2: Japanese Patent Application Publication No. 2011-231741

SUMMARY OF THE INVENTION

A control device for an internal combustion engine according to the present invention comprises
an operating-region restricting means (10, FIG. 2) that includes a restriction region (B) preset to correspond to a low-speed and high-load region over which an abnormal combustion can occur due to oil, and that restricts an actual engine operating condition such that the actual engine operating condition does not enter the restriction region (B);
an abnormal-combustion detecting means (24, 10, S4) that detects an actual occurrence of the abnormal combustion within a designated inspection region (A) set in a low-speed and high-load side as an operating region larger than the restriction region (B); and
a restriction-region variably setting means (10, S7, S9) that expands the restriction region (B) when the abnormal combustion is detected by the abnormal-combustion detecting means Generally, the designated inspection region is set to contain all engine operating conditions that can cause the abnormal combustion due to oil even very infrequently. The restriction region is variably set on a low-speed and high-load side of the designated inspection region as a part of the designated inspection region. A limitation of engine torque, a movement of shift line of an automatic transmission, or the like is performed such that an actual engine operating condition is not within the restriction region. Accordingly, the internal combustion engine remains under the engine operating condition given out of the restriction region. In case that the abnormal combustion is actually detected in the designated inspection region, the restriction region is expanded. Therefore, afterward, the abnormal combustion is inhibited from occurring frequently.

According to the present invention, an initial setting of the restriction region has a relatively small area because the restriction region is expanded when the abnormal combustion actually occurs. Therefore, the torque shortage which is caused by an excessively large setting of the restriction region can be prevented. In addition, the abnormal combustion is reliably prevented from occurring continually.

DETAILED DESCRIPTION OF INVENTION

Hereinafter, an embodiment according to the present invention will be explained in detail referring to the drawings.

Figure 1:
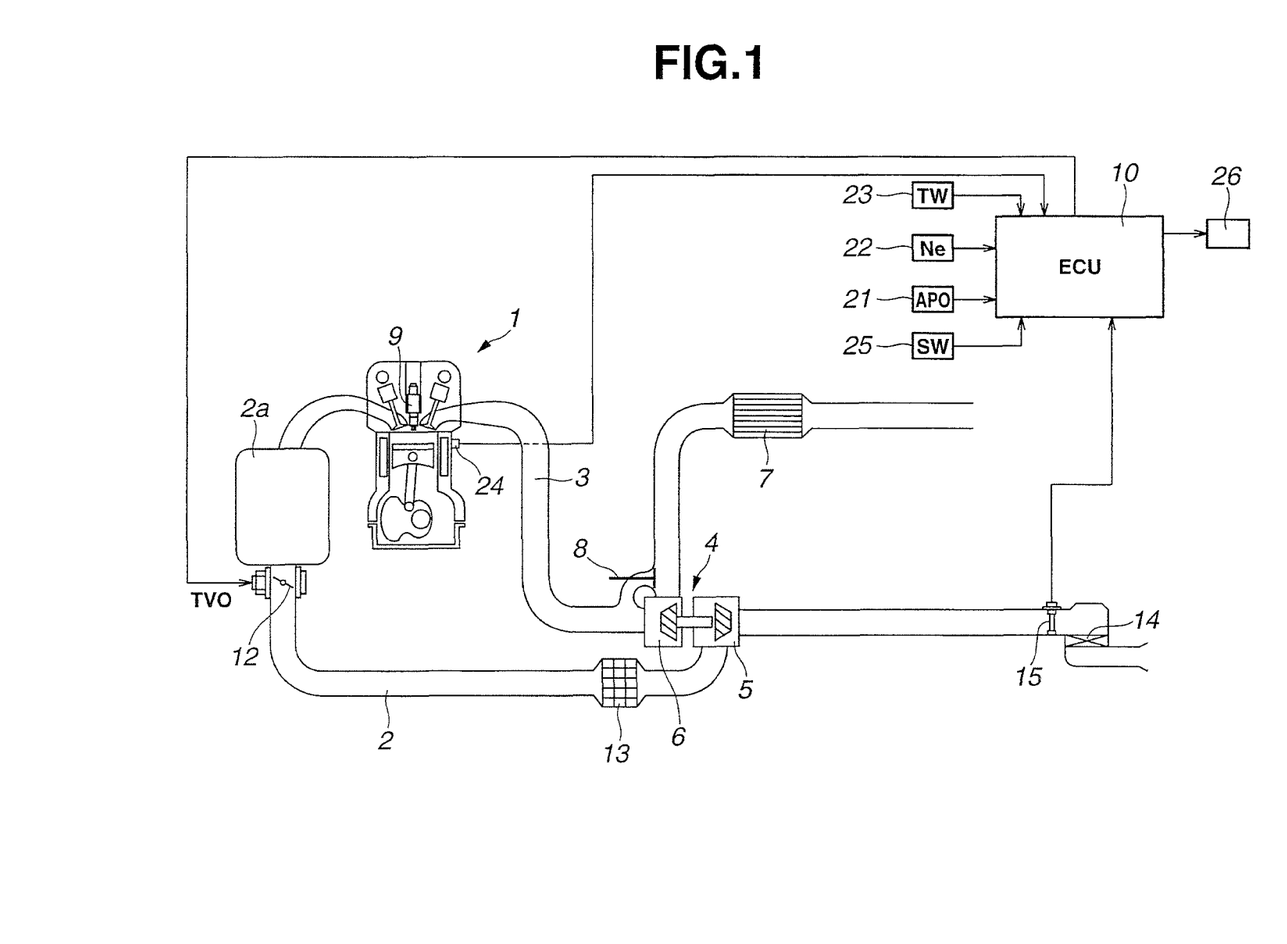
FIG. 1 A configuration explanatory view illustrating an embodiment of a control device according to the present invention.

FIG. 1 is a configuration-explanatory diagram showing a system configuration of the embodiment in which the present invention has been applied to an internal combustion engine 1 equipped with a turbocharger. For example, the internal combustion engine 1 is a four-stroke-cycle spark-ignition gasoline engine, and includes an intake passage 2 and an exhaust passage 3. A compressor 5 of the turbocharger 4 is provided in the intake passage 2 whereas an exhaust turbine 6 of the turbocharger 4 is provided in the exhaust passage 3. The exhaust turbine 6 includes a publicly-known waste gate valve 8 for a boost-pressure control (supercharging control). A catalytic converter 7 is provided in the exhaust passage 3 downstream of the exhaust turbine 6. The catalytic converter 7 uses, for example, a three-way catalyst.

The internal combustion engine 1 is, for example, a cylinder-direct-injection type engine. The internal combustion engine 1 includes a fuel injection valve (not shown) and an ignition plug 9 every cylinder. The fuel injection valve injects fuel into the cylinder. Injection timing and injection quantity of the fuel injection valve and an ignition timing of the ignition plug 9 are controlled by an engine control unit 10.

An electronically-controlled throttle valve 12 which controls an intake air quantity is provided in the intake passage 2 downstream of the compressor 5. The throttle valve 12 is located at an entrance portion of a collector section 2a of the intake passage 2. The intake passage 2 branches off toward the respective cylinders as an intake manifold, downstream of the collector section 2a. An intercooler 13 which cools a supercharged intake air is provided in the intake passage 2 at a location between the compressor 5 and the throttle valve 12.

On the other hand, an air cleaner 14 is provided at a most upstream portion of the intake passage 2. An air flow meter 15 which detects the intake air quantity is provided downstream of the air cleaner 14 and near the air cleaner 14.

The throttle valve 12 is equipped with an actuator such as an electric motor. An opening (opening degree) of the throttle valve 12 is controlled by a control signal derived from the engine control unit 10, on the basis of a detection signal of an accelerator opening sensor 21. The accelerator opening sensor 21 detects an opening (position) APO of an accelerator pedal (not shown) which is manipulated by a driver. As one preferred example, the opening TVO of the throttle valve 12 is restricted with reference to a required torque indicated by the accelerator-pedal opening APO, so that a torque limitation is realized over a restriction region.

The engine control unit 10 receives the detection signals of the above-mentioned sensors, a detection signal derived from a crank angle sensor 22 which indicates an engine rotational speed Ne, a detection signal derived from a water temperature sensor 23 which indicates a cooling water temperature Tw of the internal combustion engine 1, and the like. Moreover, in this embodiment, a detection signal of a knocking sensor 24 which is provided for detecting a knocking of the internal combustion engine 1 is used as a means for detecting an abnormal combustion caused due to oil of the internal combustion engine 1. The knocking sensor 24 is attached to a cylinder block of the internal combustion engine 1 such that the knocking sensor 24 can sense vibrations associated with combustions in the cylinder.

Moreover, in this embodiment, an oil replacement switch 25 and a warning means 26 are provided. When a workman replaces or changes lubricating oil of the internal combustion engine 1, the workman can manually operate the oil replacement switch 25 in order to indicate that the lubricating oil has been replaced with new one. The warning means 26 is, for example, a warning light or a voice warning for informing a driver and the like of an abnormality. The oil replacement switch 25 and the warning means 26 are connected to the engine control unit 10.

Figure 2:
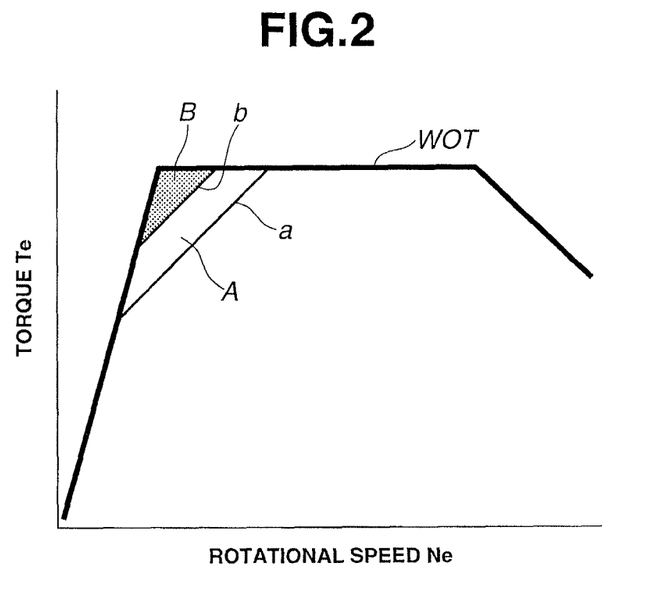
FIG. 2 An explanatory view illustrating one example of a restriction region and a designated inspection region.

FIG. 2 is an explanatory view showing a designated inspection region A and the restriction region B by using the rotational speed Ne and a torque Te of the internal combustion engine 1 as parameters. A line WOT in FIG. 2 represents a full-throttle (full-power) characteristic of whole the internal combustion engine 1 in the case that no restriction is imposed. An abnormal combustion targeted according to the present invention is a kind of preignition which is caused because an ignited combustion starts before a proper (predetermined) ignition timing due to oil entry into the cylinder through an intake-air system or a cylinder wall surface and the like, when a warming-up has not yet sufficiently completed under a low-speed and high-load condition. The designated inspection region A shown by a boundary line a in FIG. 2 corresponds to a low-speed and high-load side region over which such an abnormal combustion due to oil can occur even infrequently. The designated inspection region A is fixedly set. It is noted that the designated inspection region A exists in a supercharging region over which a supercharging pressure of the turbocharger 4 takes a positive pressure.

The restriction region B shown by a boundary line b in FIG. 2 is included in the designated inspection region A. The restriction region B is variably set in a low-speed and high-load side region of the designated inspection region A. The restriction region B can become equal to 0 at a minimum, and come to exist slightly inside of the designated inspection region A (i.e., come to exist at a slightly high-load-side location in the designated inspection region A) at a maximum. In other words, even when the restriction region B takes its maximum area, the designated inspection region A takes an operating region slightly larger than the maximum area of the restriction region B. However, as the other embodiment, the restriction region B may be set to become equal to the designated inspection region A when the restriction region B takes its maximum area.

In the example of FIG. 2, each of the designated inspection region A and the restriction region B is given as a substantially triangle-shaped region. However, shapes of the designated inspection region A and the restriction region B according to the present invention are not limited to these. According to the present invention, each of the designated inspection region A and the restriction region B can be set to have any shape. For example, the designated inspection region A and/or the restriction region B may be partitioned off by a constant torque value(s) Te and/or a constant rotational speed value(s) Ne.

The restriction region B is set as mentioned above. Hence, when the required torque of a driver which is indicated by the accelerator-pedal opening APO falls within the restriction region B, the torque limitation is imposed so that an actual torque takes a low-load-side value slightly beyond the boundary line b (i.e., substantially takes a value existing on the boundary line b). Hence, a risk of occurrence of the abnormal combustion is significantly reduced as compared with a case that the operating region is not restricted. However, a case that the restriction region B is set to have an excessively large area is not favorable because any required torque value which falls within the restriction region B is not realized, resulting in a shortage of the torque Te when accelerating a vehicle.

Therefore, in this embodiment according to the present invention, the restriction region B is enlarged in area when the abnormal combustion has just actually occurred in the designated inspection region A over which the abnormal combustion can possibly occur. On the other hand, the restriction region B is decreased in area when the abnormal combustion has not actually occurred even though an operating condition is falling within the designated inspection region A. Accordingly, the restriction region B is made (updated) to have a proper size. For example, it can be determined that the abnormal combustion has occurred, when the ignited combustion has occurred before the proper (predetermined) ignition timing in the designated inspection region A, on the basis of the detection signal of the knocking sensor 24.

Figure 3:
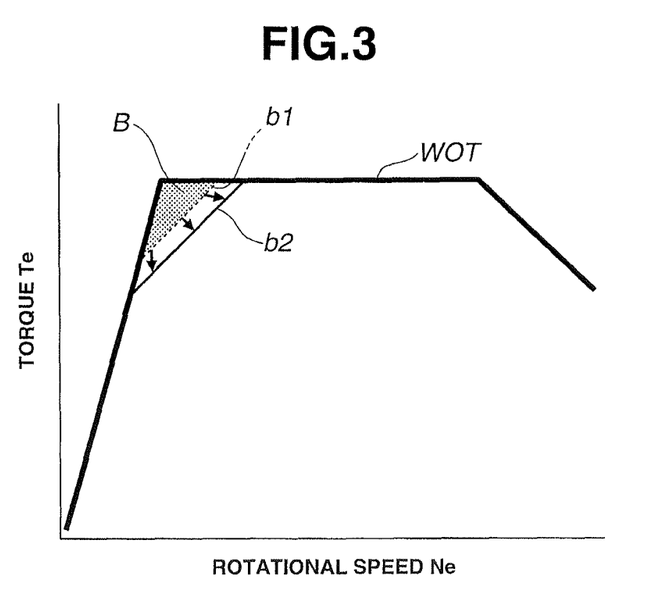
FIG. 3 An explanatory view illustrating an expansion of the restriction region.

FIG. 3 is a view showing one example of the enlargement of the restriction region B. For example, when the abnormal combustion has just actually occurred under a condition that the restriction region B is partitioned by a boundary line b1 to occupy (fill) a high-load-side region from the boundary line b1, the restriction region B expands up to an area shown by a boundary line b2. That is, at this time, the restriction region B expands to additionally occupy a further low-load-side region and a further high-speed-side region.

Moreover, the expansion of the restriction region B is variably done based on an occurrence frequency of the abnormal combustion in the designated inspection region A. In one example, the occurrence frequency is indicated by an accumulated operating time (Ti) which is given between a timing at which a previous (last-time) abnormal combustion occurred in the designated inspection region A and a timing at which a current (this-time) abnormal combustion has just occurred in the designated inspection region A. That is, if the operating time (length) accumulated until one abnormal combustion occurs is long, the occurrence frequency is low. On the other hand, if the operating time accumulated until one abnormal combustion occurs is short, the occurrence frequency is high.

Figure 4:
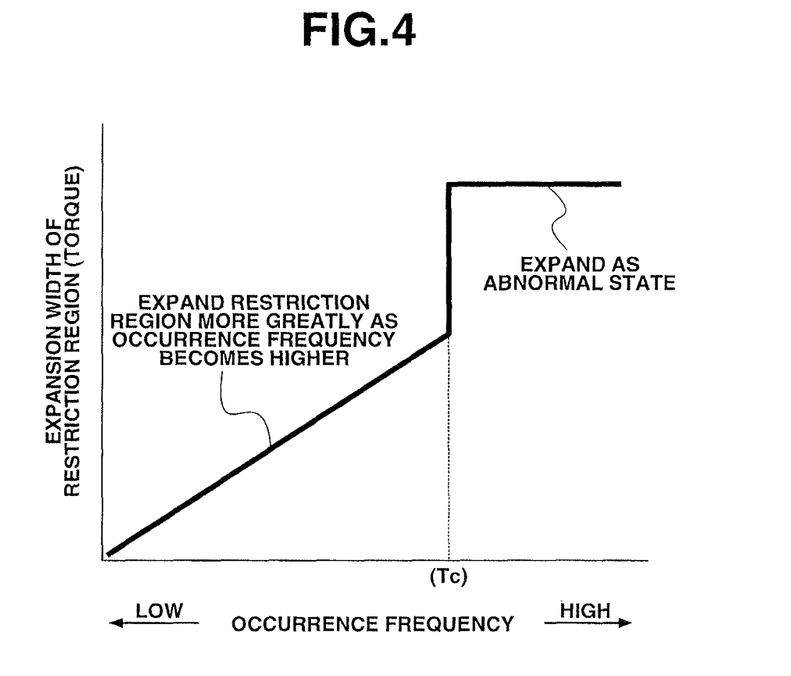
FIG. 4 A characteristic view illustrating a relation between an occurrence frequency of abnormal combustion and an expansion width of the restriction region at the time of occurrence of the abnormal combustion.

As shown in FIG. 4, an expansion width (expansion amount) of the restriction region B which is applied in response to one occurrence of the abnormal combustion becomes larger as the occurrence frequency becomes higher. This setting is for purpose of promptly suppressing the actual abnormal combustion by quickly expanding the restriction region B in the case that the actual abnormal combustion is occurring at relatively short intervals.

Moreover, as shown in FIG. 4, when the occurrence frequency is higher than a certain threshold value (specifically, when the accumulated operating time Ti in the designated inspection region A until one occurrence of the abnormal combustion is shorter than a threshold value Tc), the restriction region B is expanded at once up to a predetermined area (predetermined size) given for an abnormal state. For example, in a case that oil is in an excessively deteriorated state (i.e. viscosity-reduced state), or in a case that a large amount of deposit is sticking into a combustion chamber, the abnormal combustion is easy to cause. Therefore, when the abnormal combustion is detected at a high frequency (i.e. at a short time interval), it is determined that a current state is in the abnormal state, and the restriction region B is expanded at a substantially maximum. At the same time, the warning means 26 such as the warning light and the voice warning is actuated so as to inform a driver of the abnormal state.

Next, the restriction region B which was expanded based on the detection of the abnormal combustion as mentioned above is gradually decreased (downsized) until a next abnormal combustion occurs. However, in the case that the area of the restriction region B was expanded at the substantially maximum because of the determination of the abnormal state such as the oil deterioration, the restriction region B is not decreased. This is because the abnormal combustion unfavorably occurs at a high frequency again if the restriction region B is decreased without resolving a cause of the abnormal state.

In this embodiment, a decreasing speed when decreasing the restriction region B is variably set also based on the occurrence frequency of the abnormal combustion. This setting is grounded on the following ideas. That is, when the occurrence frequency of the abnormal combustion is low, it is favorable that the decreasing speed of the restriction region B is increased in order to promptly eliminate the torque limitation. On the other hand, when the occurrence frequency of the abnormal combustion is high, there is a high possibility that the abnormal combustion occurs again when decreasing the restriction region B, and hence it is favorable that the restriction region B is gradually decreased.

Figure 5:
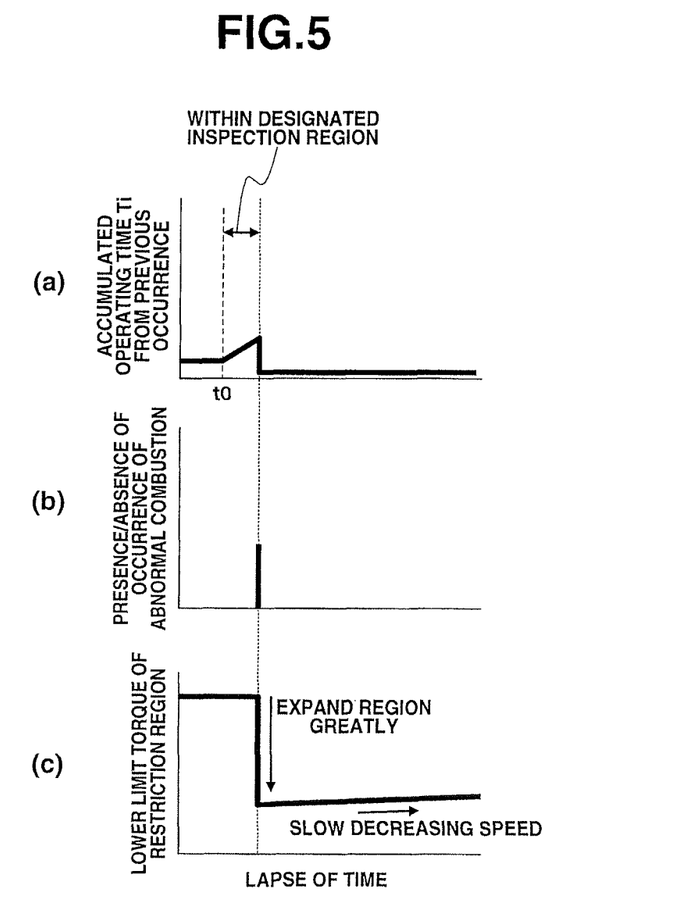
FIG. 5 A time chart illustrating one example when the abnormal combustion occurs.
Figure 6:
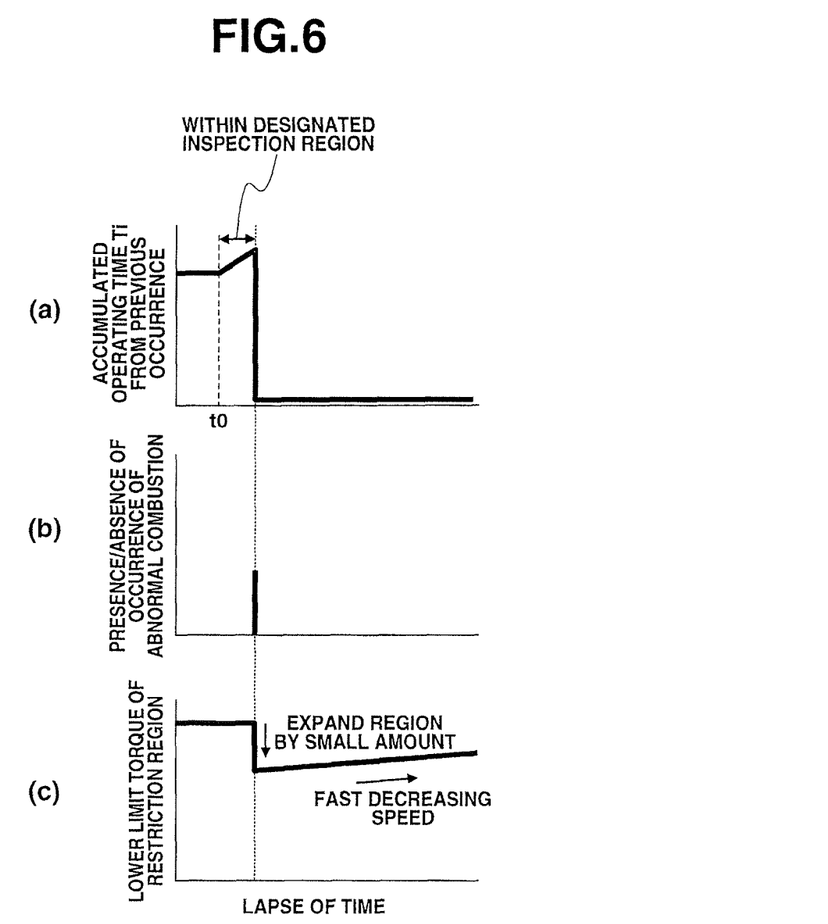
FIG. 6 A time chart illustrating another example when the abnormal combustion occurs.

FIGS. 5 and 6 are views for explaining a difference of the above-mentioned decreasing speed. FIG. 5 shows an example in the case that the occurrence frequency is high. FIG. 5(*a*) shows the accumulated operating time Ti which has been counted in the designated inspection region A from a previous detection of the abnormal combustion. At time point t0, the engine operating condition enters the designated inspection region A again. Accordingly, the accumulated operating time Ti is increased such that a newly-counted time is added to a stored value of the accumulated operating time Ti. In the example of FIG. 5, a next abnormal combustion is detected as shown in FIG. 5(*b*) at a timing at which the accumulated operating time Ti is relatively short. In response to this detection of the abnormal combustion, the restriction region B is expanded, and the accumulated operating time Ti is reset to zero. FIG. 5(*c*) shows a variation of the size of the restriction region B by using a lower limit torque (see the boundary line b of FIG. 2) of the restriction region B. As shown in FIG. 5(*c*), the restriction region B is expanded at the timing of the detection of abnormal combustion. At this timing, the expansion width (expansion amount) is relatively large. Then, the restriction region B is gradually decreased until a next abnormal combustion occurs. The decreasing speed of the restriction region B at this time is relatively low so that the lower limit torque rises slowly.

On the other hand, FIG. 6 shows an example in the case that the occurrence frequency is low. FIG. 6(*a*) shows the accumulated operating time Ti which has been counted in the designated inspection region A from a previous detection of the abnormal combustion. At time point t0, the engine operating condition enters the designated inspection region A again. Because the accumulated operating time Ti which has already been counted is long, the accumulated operating time Ti when a next abnormal combustion is detected as shown in FIG. 6(*b*) is longer than the example of FIG. 5. In response to this detection of the abnormal combustion, the restriction region B is expanded, and the accumulated operating time Ti is reset to zero. As shown by the lower limit torque of FIG. 6(*c*), the restriction region B is expanded by a relatively small expansion width (expansion amount) at the timing of detection of the abnormal combustion. Then, the restriction region B is gradually decreased until a next abnormal combustion occurs. The decreasing speed of the restriction region B at this time is set at a relatively high value, so that the lower limit torque rises promptly.

As mentioned above, the restriction region B is repeatedly expanded and decreased in accordance with presence or absence of the actual abnormal combustion in the designated inspection region A. It is noted that the abnormal combustion which is caused by oil occurs when a wall temperature of the cylinder is relatively low, and basically does not occur when the wall temperature of the cylinder is high after the engine warming-up is completed. Therefore, a basic area (size) of the restriction region B is set based on a temperature condition of the internal combustion engine 1, such as the cooling water temperature Tw which is sensed by the water temperature sensor 23. Hence, concretely, the basic area of the restriction region B set based on the cooling water temperature Tw is further expanded and decreased according to the presence/absence of the abnormal combustion.

On the other hand, in the case that the restriction region B has been expanded up to its substantially maximum area because the abnormal combustion was detected at a frequency higher than the predetermined threshold value, the restriction region B is not decreased unless an improvement judgment of engine state such as a detection of oil replacement and a detection of deposit disappearance of the combustion chamber is done. As one example, the restriction region B returns to its initial size (i.e. the basic area of the restriction region B given according to the cooling water temperature Tw), on the basis of the signal of the oil replacement switch 25 which is manually operated when replacing the oil. It is noted that the oil replacement can be detected from an oil-pressure change under an identical operating condition, an oil-level change inside an oil pan, or the like. Moreover, for example, it can be judged that the deposit has disappeared when the knocking in a low-or-middle load region decreased rapidly at a certain time point. This is because, if the deposit is sticking to the combustion chamber, the knocking occurs in the low-or-middle load region in which the knocking normally does not occur. In a case that a cylinder pressure sensor is provided, it can be judged that the deposit has disappeared if a compression-end temperature of the combustion decreased to a normal level at a certain time point.

Figure 7:
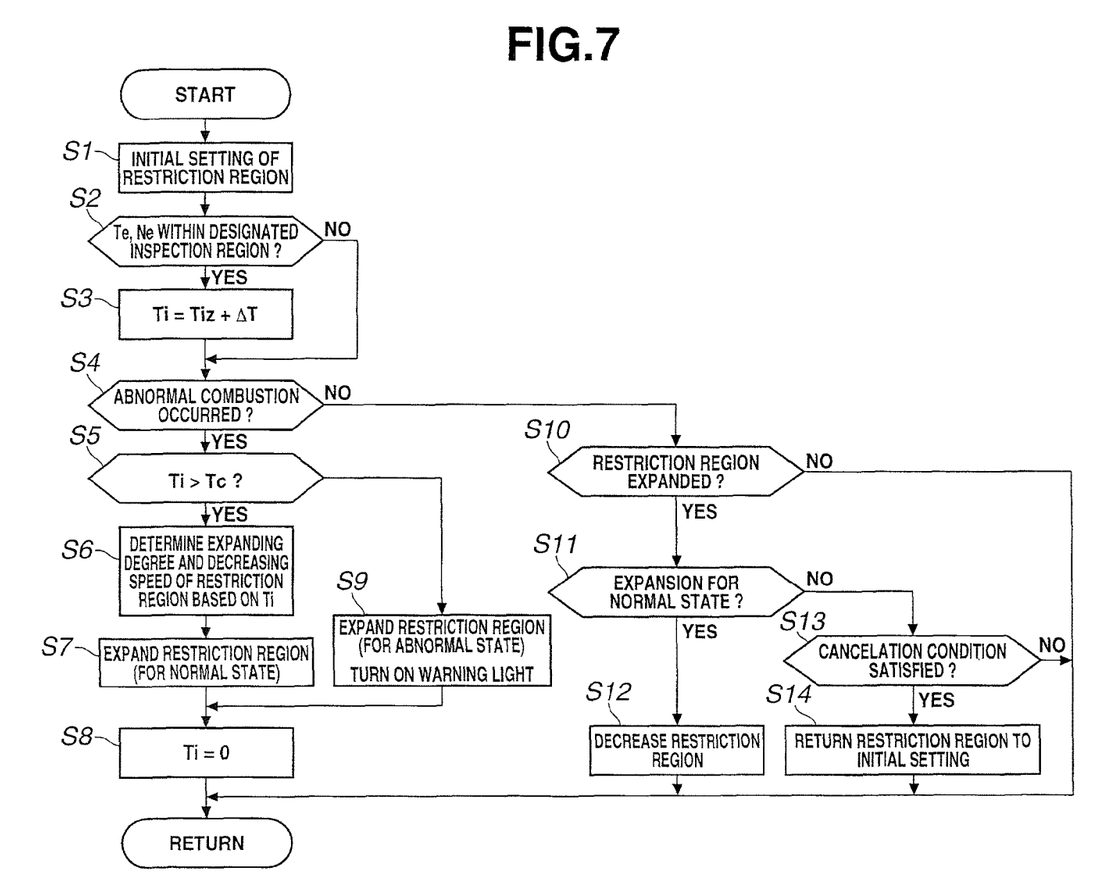
FIG. 7 A flowchart illustrating a control flow in the embodiment.

Next, FIG. 7 is a flowchart showing a control flow which is executed by the engine control unit 10. This control flow will now be explained. A routine shown in FIG. 7 is repeatedly executed during an operating state of the internal combustion engine 1. At a first step 1, an initial setting for the restriction region B is done. Specifically, the restriction region B is set according to the temperature condition of the internal combustion engine 1 at a current moment. For example, the restriction region B is set to be larger as the cooling water temperature Tw becomes lower. It is noted that, if the restriction region B has been expanded at the substantially maximum based on the judgment of the abnormal state such as the oil deterioration in a previous trip, this expanded state is continued in a current trip.

At step 2, it is judged whether or not the operating condition (i.e., the torque Te and the rotational speed Ne) of the internal combustion engine 1 is within the designated inspection region A. It is noted that this torque Te is not the required torque but a torque resulting from the torque limitation of the restriction region B. If the operating condition is within the designated inspection region A, the program proceeds to step 3. At step 3, the accumulated operating time Ti is calculated by adding an execution time interval ΔT of this routine to a previous accumulated operating time Tiz. If the operating condition is not within the designated inspection region A, the previous accumulated operating time Ti is maintained.

At step 4, it is judged whether or not the abnormal combustion has occurred. As mentioned above, the abnormal combustion can be detected by use of the knocking sensor 24. Alternatively, the abnormal combustion can be detected by use of the cylinder pressure sensor, an ion current sensor or the like.

If the abnormal combustion has occurred, the program proceeds to step 5. At step 5, it is judged whether or not the accumulated operating time Ti is greater than the threshold value Tc. That is, the frequency of the abnormal combustion is judged. If the accumulated operating time Ti is greater than the threshold value Tc, the program proceeds to step 6 because the frequency is low. At step 6, an expanding degree of the restriction region B (see FIG. 4) and the decreasing speed of the restriction region B (see FIGS. 5 and 6) are determined based on the accumulated operating time Ti. Then, at step 7, the expansion of the restriction region B is carried out. At this time, the restriction region B is expanded as a normal-state expansion after which the decrease of the restriction region B is permitted. Then, at step 8, the accumulated operating time Ti is reset to 0. It is noted that, although an initial value of the restriction region B is set according to the engine temperature at step 1, the expansion/decrease of the restriction region B for this normal state is also reflected to the setting of step 1 in a next routine.

On the other hand, if the accumulated operating time Ti is smaller than or equal to the threshold value Tc at step 5, the program proceeds to step 9 because the frequency is abnormally high. At step 9, the restriction region B is expanded at once to the predetermined size for the abnormal state (i.e., up to the substantially maximum size) (see FIG. 4). At the same time, the warning means 26 such as the warning light is actuated.

If the abnormal combustion has not been detected at step 4, the program proceeds to step 10. At step 10, it is judged whether or not the restriction region B was expanded. In other words, it is judged whether or not the restriction region B remains in its initial state set at step 1. If the restriction region B remains in its initial state, the routine is terminated. If the restriction region B was expanded from its initial state, it is judged whether the expansion of the restriction region B was given for the normal state or for the abnormal state at step 11. If the expansion of the restriction region B was given for the normal state of step 7, the program proceeds to step 12. At step 12, the decrease of the restriction region B is carried out by using the decreasing speed determined at step 6. Accordingly, if a state where the abnormal combustion is not detected continues, the restriction region B continues to gradually decrease and finally returns to the initial value set according to the engine temperature.

If it is determined that the expansion of the restriction region B was given for the abnormal state at step 11, the program proceeds to step 13. At step 13, it is judged whether or not a cancelation condition has been satisfied. If the cancelation condition has been satisfied, the restriction region B is returned to its initial state at step 14. If the cancelation condition has not yet been satisfied, the expansion of the restriction region B is maintained. This cancelation condition is satisfied by the improvement of engine state such as the oil replacement and the deposit disappearance, as mentioned above.

Although the embodiment according to the invention has been explained above in detail, the invention is not limited to the embodiment described above. Various modifications of the above-described embodiment are possible.

For example, the operating condition of the internal combustion engine 1 is restricted not to enter the restriction region B by limiting the throttle-valve opening TVO associated with the accelerator-pedal opening APO in the above embodiment. However, in a case that an automatic transmission (also CVT) is provided, a shift line of the automatic transmission may be varied such that an operating point does not enter the restriction region B. Alternatively, the operation within the restriction region B can be limited by restricting the supercharging pressure.

Moreover, in the above embodiment, the frequency is expressed by the time interval between the previous occurrence of abnormal combustion and the current occurrence of abnormal combustion. However, it may be judged whether or not the frequency is high, e.g., from an average value of a plurality of time intervals among the abnormal combustions.

What is claimed is:

1. A control device for an internal combustion engine, comprising:
   an operating-region restricting section that includes a restriction region preset to correspond to a low-speed and high-load region over which an abnormal combustion can occur due to oil, and that restricts an actual engine operating condition such that the actual engine operating condition does not enter the restriction region;
   an abnormal-combustion detecting section that detects an actual occurrence of the abnormal combustion within a designated inspection region set in a low-speed and high-load side as an operating region larger than the restriction region; and
   a restriction-region variably setting section that expands the restriction region when the abnormal combustion is detected by the abnormal-combustion detecting section during an operating state of the internal combustion engine.

2. The control device according to claim 1, wherein the restriction-region variably setting section expands the restriction region more greatly as an accumulated operating time within the designated inspection region until the abnormal combustion is detected becomes shorter.

3. The control device according to claim 1, wherein the restriction-region variably setting section gradually decreases the restriction region while the abnormal combustion is not detected.

4. The control device according to claim 3, wherein the restriction-region variably setting section sets a decreasing speed of the restriction region at a lower value as a detection frequency of the abnormal combustion relative to an operating time within the designated inspection region becomes higher.

5. The control device according to claim 2, wherein the restriction-region variably setting section expands the restriction region up to a predetermined size given for an abnormal state when the accumulated operating time within the designated inspection region until the abnormal combustion is detected is smaller than or equal to a predetermined threshold value.

6. The control device according to claim 5, further comprising
   a warning section that informs of the abnormal state when the accumulated operating time within the designated inspection region until the abnormal combustion is detected is smaller than or equal to the predetermined threshold value.

7. The control device according to claim 5, wherein the restriction-region variably setting section returns the restriction region to an initial state when at least one of a judgment of oil replacement and a judgement of engine-state improvement is done.

8. The control device according to claim 7, wherein the judgment of oil replacement is done based on a measurement of oil pressure of the internal combustion engine, a measurement of oil level or a manual operation after replacing oil.

9. The control device according to claim 7, wherein the judgement of engine-state improvement is done based on a measurement of cylinder pressure of the internal combustion engine or a measurement of knocking under a low or middle load.

10. The control device according to claim 1, wherein the operating-region restricting section restricts the engine operating condition by limiting an engine torque required by a driver, or by moving a shift line of an automatic transmission.

11. The control device according to claim 1, wherein the abnormal-combustion detecting section detects the occurrence of the abnormal combustion due to oil, from a signal of a knocking sensor or a signal of a cylinder pressure sensor.

12. A control method for an internal combustion engine, comprising:
   presetting a restriction region corresponding to a low-speed and high-load region over which an abnormal combustion can occur due to oil,
   restricting an actual engine operating condition such that the actual engine operating condition does not enter the restriction region;
   detecting an actual occurrence of the abnormal combustion within a designated inspection region set in a low-speed and high-load side as an operating region larger than the restriction region; and
   expanding the restriction region when the abnormal combustion is detected during an operating state of the internal combustion engine.

* * * * *